United States Patent Office 2,751,912
Patented June 26, 1956

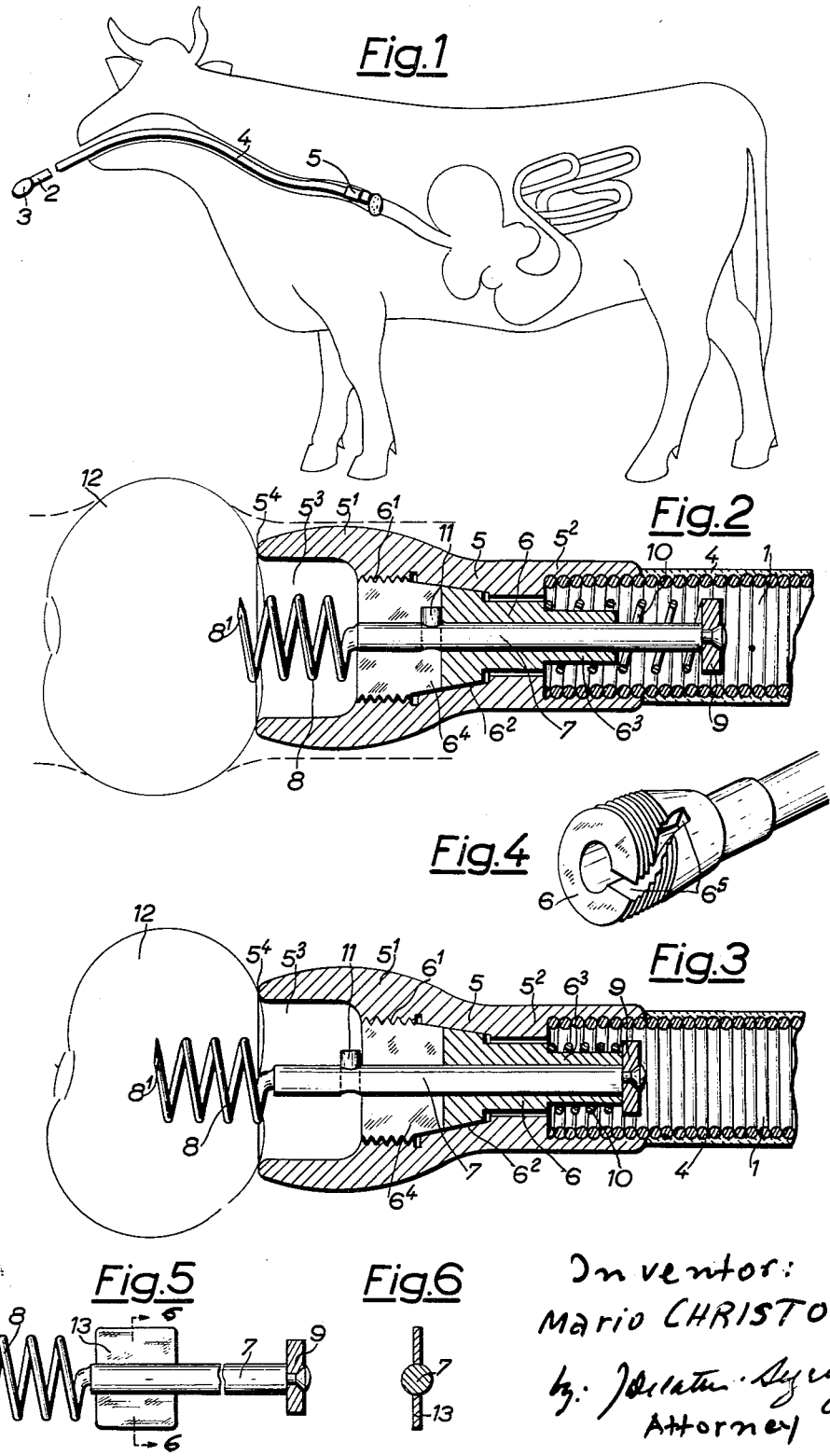

2,751,912

EXTRACTING DEVICE FOR USE WITH OESOPHAGEAL PROBES, INTENDED PARTICULARLY FOR RUMINANTS

Mario Christoni, Saint-Etienne-Loire, France

Application March 27, 1953, Serial No. 345,021

Claims priority, application France April 7, 1952

5 Claims. (Cl. 128—356)

Ruminants often snatch a tuber such as a potato, a Jerusalem artichoke or the like, or else some fruit or the like body or substance as they pass along a road or across a field, or in any similar circumstances. The size of such a tuber or fruit does not allow it to be swallowed normally and after a few efforts made by the animal, the tuber or fruit is arrested inside the animal's oesophagus. This leads to suffocation and prevents the animal from feeding.

To cut out such mishaps, the general procedure consists in attempting to push the foreign body into the animal's stomach by means of some rammer or else of an oesophageal probe with a view to try and make the animal digest it. The efficiency of this method is however somewhat problematical.

My invention has for its object an extracting device adapted for use with oesophageal probes so that it may act rapidly and speedily and relieve the animal to which the accident has happened as a consequence of an unfortunate occurrence.

According my invention, I provide a probang fitted to the flexible stem of the probe and recessed so as to form an annular chamber carrying slidingly a sort of corkscrew that serves for the removal of the foreign body.

I have illustrated by way of example in accompanying drawings a preferred embodiment of my invention. In said drawings:

Fig. 1 shows diagrammatically how an oesophageal probe, equipped with my improved extracting means, may serve for the removal of a foreign body jammed inside the oesophagus of the animal the outline of which has been sketched in thin lines.

Fig. 2 is an axial cross-section of the end of a probe equipped with such extracting means in a position for which it is in contact with the body to be removed, the dot-and-dash lines illustrating the sinuous shape of the alimentary canal with reference to the probang secured to the end of the probe.

Fig. 3 is a sectional view similar to Fig. 2, showing the engagement inside the body to be removed of the corkscrew-shaped claw with a view to extracting said body from the alimentary canal of the animal.

Fig. 4 is a perspective view of a second embodiment of the socket holding the corkscrew and provided with a helical slot.

Fig. 5 illustrates a modified form of the invention.

Fig. 6 is a transverse section along line 6—6 of Fig. 5.

The extracting means are fitted over a probe the flexible stem 1 of which is constituted in any known or suitable manner, for instance by a strip of rubber or the like yielding material or again, as illustrated, said stem may be constituted by a metal wire wound into close convolutions and carrying at its end 2 a terminal olive-shaped knob 3 which furthers the engagement of the probe inside the oesophagus, while the other end of the stem 1 carries the actual probang 5. In this latter case, the flexible stem may be provided with a protecting coat 4 of a suitable plastic material.

In the arrangement according to my invention, the probang 5 includes an outwardly convex part $5^1$ the outline of which has a diameter smaller towards its front so as to further the introduction and shifting of the probe inside the alimentary canal of the animal without engaging or injuring the latter.

The maximum outer diameter of the part $5^1$ corresponds approximately to the diameter of the oesophagus so as to center and guide the probang in the latter.

The convex part $5^1$ is connected with a rear cylindrical part $5^2$ inside which is fitted the end of the flexible stem 1 of the probang. The latter is secured to the end of the flexible stem either through direct casting over the stem or through any other known or suitable means.

The front convex part $5^1$ of the probang encloses a large diameter chamber $5^3$ the front circular edge of which is connected through a rounded section $5^4$ with the front annular edge of the probang, of slightly reduced diameter. This arrangement produces a centering and a holding fast of the probang in register with the foreign body to be extracted by providing a solid hold on the latter.

Axially of and in alignment with the rear end of the chamber $5^3$, the probang is bored and tapped so as to carry a socket 6 which is screwed at $6^1$ inside the probang bore, said socket being centered at $6^2$ in a conical bearing formed in said bore.

The socket 6 is axially bored throughout for housing slidingly a rod 7 the front end of which is rigid with a helical operative member acting as a corkscrew. The rear end of the rod 7 carries a washer 9 that is riveted or secured in any other suitable manner to said rod, said washer serving as a bearing for one end of a spring 10. The latter is mounted against compression and engages through its other end a shoulder formed in the socket 6 to the front of the rear bearing surface $6^3$ round which the spring 10 is partly wound.

The rod 7 carries a stud 11 engaging a slot $6^4$ extending diametrically through the socket whereby the latter is clamped inside the probang.

The thread of the socket 6 inside the probang is directed in a manner such that it has a tendency to lock the socket when it is desired to engage a foreign body by turning the helical member 8 clockwise.

The number of convolutions and consequently the length of the helical member is such that only the extreme half-convolution $8^1$ projects beyond the plane passing through the front annular edge of the probang. The spring 10 holds the helical member in this partly projecting position. Consequently, even in the case of a very marked incurvation of the alimentary canal, the end of the member 8 cannot reach the wall of the alimentary canal or injure it.

On the other hand, the helical member 8 has a large diameter consistent with the conditions of operation so that it may reliably engage the body to be removed, whereby the crumbling away of said body is made impossible during the actual extraction.

The probe thus equipped with the extracting means described is introduced into the oesophagus of the animal which has untimely ingested a tuber, a fruit or the like, said probe being introduced through its end carrying the probang until it meets the foreign body.

At this moment, a slight rotation is impressed to the probe so as to make the outermost half-convolution $8^1$ of the helical member engage the obstructing body 12 (Fig. 2). This initiates a screwing of the claw 8 inside the body 12, which screwing continues when a rotation of the stem of the probe is provided in the desired direction.

The body to be removed 12 is reliably centered and bears against the front surface of the probang into which the chamber 5³ opens and the rotation, screwing the helical member inside the foreign body, produces a translational movement of said member and of its carrier rod 7, which compresses the spring 10 until the stud 11 moves out of the slot 6⁴, i. e. up to the moment at which the corkscrew 8 is completely and tightly held inside the body to be removed. The probe and the probang revolve now freely round the rod 7 and it is therefore possible to exert the necessary tractional effort with a view to removing the obstructing body from the alimentary canal of the animal without any risk of the corkscrew creeping out of the body.

In a modification illustrated in Fig. 4, the socket 6 is provided no longer with a diametrical slot 6⁴ but with a helical slot 6⁵ engaged by the stud 11. This arrangement shows the advantage of furthering the engagement of the corkscrew member 8 inside the foreign body 12 to be removed since the stud 11 is no longer merely rotated but also and additionally urged forwardly by reason of the helical shape given in the desired direction to the slot 6⁵.

As a further modification, it has been proposed also to substitute for the driving stud 11, a guiding blade 13 shown in Figs. 5 and 6, and rigid with the rod 7. This blade engages the diametrical slot 6⁴ and furthers the translational movement of the rod 7, and thereby the engagement of the helical member 8, by reason of said blade bearing inside the slot 6⁴ over a large area which furthers its forward sliding movement.

The extracting means constituted chiefly by the socket, its helical corkscrew-shaped member and the spring 10 is readily dismantled in order to allow the cleaning and possibly the replacement of certain parts or again to allow the use of the probang alone as a mere pushing member.

The interest of the probe thus equipped is readily apparent and obviously many modifications may be brought thereto without unduly widening thereby the scope of accompanying claims.

What I claim is:

1. In an oesophageal probe intended chiefly for ruminants and having a stem, the combination with the stem of the probe of extracting means including a probang fitted on the inner end of the probe stem, the front part of said probang having a reduced diameter smaller than the miximum diameter of said probang, said probang being recessed at its front end to form a circular chamber of a large diameter opening at its front end into the front part of reduced diameter of the probang and extending to the rear into an axial partly conical bore formed inside the probang, a socket fitted inside said bore and the wall of which is slotted in a diametrical plane, a corkscrew-shaped part having a sharp forward end and adapted to engage a foreign body in the oesophagus of the ruminant through said sharp forward end, a rod carrying said corkscrew-shaped part coaxially at the front end of said rod and slidingly housed inside the socket, a radial stud rigid with said rod and engaging the slot in the socket, and a spring urging normally the corkscrew-shaped part inwardly to allow only the extreme front thereof to project beyond the front edge of the probang for engagement with the foreign body.

2. In an oesophageal probe intended chiefly for ruminants and having a stem, the combination with the stem of the probe of extracting means including a probang fitted on the inner end of the probe stem, the front part of said probang having a reduced diameter smaller than the maximum diameter of said probang, said probang being recessed at its front end to form a circular chamber of a large diameter opening at its front end into the front part of reduced diameter of the probang and extending to the rear into an axial partly conical bore formed inside the probang, a socket fitted inside said bore and the wall of which is slotted in a diametrical plane, a corkscrew-shaped part having a sharp forward end and adapted to engage a foreign body in the oesophagus of the ruminant through said sharp forward end, a rod carrying said corkscrew-shaped part coaxially at the front end of said rod and sliding housed inside the socket, a radial blade rigid with said rod over a length substantially equal to that of the slot in the socket and engaging said slot and a spring urging normally the corkscrew-shaped part inwardly to allow only the extreme front thereof to project beyond the front edge of the probang for engagement with the foreign body.

3. In an oesophageal probe intended chiefly for ruminants, and having an elongated flexible stem, in combination: extracting means including a probang fitted on the forward end of said stem, at least the forward portion of the outer wall of said probang being convex and the front cross-section of said probang being smaller than the maximum cross-section of said convex portion; said probang being axially recessed to form at its front portion a large inner circular chamber opened at said front cross-section of said probang, and an axial partly conical inner bore extending rearward of said large chamber; the wall of said large chamber and the outer wall of said probang being joined by a rounded front edge wall; a socket fitted inside said bore; a slot in the wall of the forward portion of said socket; said slot extending in a rear to front direction; a rod coaxially and slidingly housed in said socket; a radial guiding member rigid with said rod and engaging said slot; a corkscrew-shaped part attached to the forward end of said rod and having a sharp forward tip adapted to engage a foreign body in the oesophagus; and resilient spring means cooperating with the rear of said socket and the rear end of said rod, said spring means normally urging said rod and corkscrew-shaped part rearwardly, to allow normally only the forward tip of said part to protrude beyond said front cross-section of said probang for initial engagement with said foreign body.

4. A probe as claimed in claim 3, in which said slot extends on the wall of said socket along a helical line, and in which said radial guiding member is a stud.

5. A probe as claimed in claim 3, in which an operational rotation of said probe engages fully the said corkscrew-shaped part into said foreign body and concurrently disengages said radial guiding member from said slot, whereby said rod and corkscrew-shaped part are free to swivel about the axis of said probang, as a result of the aforesaid full engagement of said part into said foreign body, forward of the front cross-section of said probang.

References Cited in the file of this patent
UNITED STATES PATENTS

| | | |
|---|---|---|
| 701,791 | Andros | June 3, 1902 |
| 1,421,169 | Chmura | June 27, 1922 |
| 2,522,219 | Gaeta | Sept. 12, 1950 |